United States Patent
Hou et al.

(10) Patent No.: US 9,597,986 B2
(45) Date of Patent: Mar. 21, 2017

(54) CAR SEAT BASE WITH A LOCK POSITION INDICATOR MECHANISM

(71) Applicant: LERADO (ZHONG SHAN) INDUSTRIAL CO., LTD., Zhong Shan, Guang Dong Province (CN)

(72) Inventors: Hung-Chung Hou, Taibao (TW); Yu-Te Chou, Chiayi County (TW); Yu-Le Lin, Yunlin County (TW)

(73) Assignee: DOREL JUVENILE (ZHONGSHAN) PRODUCT CO., LTD., Guang Dong (CN)

( * ) Notice: Subject to any disclaimer, the term of this patent is extended or adjusted under 35 U.S.C. 154(b) by 738 days.

(21) Appl. No.: 14/027,836

(22) Filed: Sep. 16, 2013

(65) Prior Publication Data

US 2015/0048660 A1    Feb. 19, 2015

(30) Foreign Application Priority Data

Aug. 15, 2013   (CN) ..................... 2013 2 0500622 U (51) Int. Cl.
| | |
|---|---|
| *B60N 2/26* | (2006.01) |
| *B60N 2/28* | (2006.01) |
| *B60N 2/44* | (2006.01) |
| *B60N 2/42* | (2006.01) |

(52) U.S. Cl.
CPC ............. *B60N 2/44* (2013.01); *B60N 2/2821* (2013.01); *B60N 2/43* (2013.01)

(58) Field of Classification Search
CPC ........... B60N 2/2821; B60N 2/43; B60N 2/44
USPC ......................................... 297/250.1–256.16
See application file for complete search history.

(56) References Cited

U.S. PATENT DOCUMENTS

| | | | | |
|---|---|---|---|---|
| 4,634,177 A * | 1/1987 | Meeker | ................ | A47D 13/025 297/256.16 X |
| 5,538,322 A * | 7/1996 | Cone | ...................... | B60N 2/286 297/216.11 |
| 6,017,087 A * | 1/2000 | Anthony | .............. | B60N 2/2821 297/256.16 X |
| 6,322,142 B1 * | 11/2001 | Yoshida | .............. | B60N 2/2806 297/256.16 X |
| 6,347,832 B2 * | 2/2002 | Mori | .......................... | 297/250.1 |
| 6,863,286 B2 * | 3/2005 | Eros | ......................... | B62B 9/28 297/256.16 X |
| 7,159,948 B1 * | 1/2007 | Wolf | .................... | B60N 2/2887 297/253 |

(Continued)

*Primary Examiner* — Rodney B White
(74) *Attorney, Agent, or Firm* — Muncy, Geissler, Olds & Lowe, P.C.

(57) ABSTRACT

A car seat base with a lock position indicator mechanism, includes at least two locking units, an indicating unit and an associating unit. The locking units are mounted inside the base, each has a locked position for locking a car seat thereupon, and an unlocked position that permits the car seat to be released from the base. The indicating unit provides a first color area and a second color area for indicating the positions of the locking units. The associating unit is associated between the locking units and the indicating unit; when all of the locking units have been moved to the locked position, the associating unit associates the indicating unit to reveal the first color area; and when one of the locking unit is failed to move to the locked position, the associating unit associates the indicating unit to reveal the second color area.

10 Claims, 9 Drawing Sheets

(56) References Cited

U.S. PATENT DOCUMENTS

| | | | | |
|---|---|---|---|---|
| 7,488,034 B2* | 2/2009 | Ohren | B60N 2/2821 |
| | | | 297/256.16 X |
| 7,559,606 B2* | 7/2009 | Hei | B60N 2/2806 |
| | | | 297/256.16 X |
| 8,070,226 B2* | 12/2011 | Dingler | B60N 2/2821 |
| | | | 297/256.16 X |
| 8,366,192 B2* | 2/2013 | Clement | B60N 2/2821 |
| | | | 297/256.16 X |
| 8,434,821 B2* | 5/2013 | Gibree | B60N 2/2806 |
| | | | 297/256.16 X |
| 8,998,317 B2* | 4/2015 | Guo | B60N 2/2821 |
| | | | 297/256.16 X |
| 2001/0011839 A1* | 8/2001 | Mori | B60N 2/2821 |
| | | | 297/256.13 |
| 2003/0164632 A1* | 9/2003 | Sedlack | A47D 13/02 |
| | | | 297/256.16 |
| 2005/0264064 A1* | 12/2005 | Hei | B60N 2/2806 |
| | | | 297/250.1 |
| 2008/0054692 A1* | 3/2008 | Lhomme | B60N 2/2821 |
| | | | 297/250.1 |
| 2008/0054693 A1* | 3/2008 | Lhomme | B60N 2/2869 |
| | | | 297/250.1 |
| 2008/0296944 A1* | 12/2008 | Nakagawa | B60N 2/2809 |
| | | | 297/256.16 X |
| 2011/0074194 A1* | 3/2011 | Weber | B60N 2/2821 |
| | | | 297/256.16 X |
| 2011/0089731 A1* | 4/2011 | Gibree | B60N 2/2806 |
| | | | 297/250.1 |
| 2011/0140491 A1* | 6/2011 | Williams | B60N 2/2806 |
| | | | 297/256.16 |
| 2012/0126597 A1* | 5/2012 | Hall | B60N 2/2809 |
| | | | 297/250.1 |
| 2013/0026804 A1* | 1/2013 | Guo | B60N 2/2806 |
| | | | 297/250.1 |
| 2013/0088058 A1* | 4/2013 | Szakelyhidi | B60N 2/2806 |
| | | | 297/256.16 |
| 2014/0001804 A1* | 1/2014 | Chen | B60N 2/2821 |
| | | | 297/256.16 |
| 2014/0300155 A1* | 10/2014 | Lehman | B60N 2/2806 |
| | | | 297/256.16 |
| 2016/0031343 A1* | 2/2016 | Juchniewicz | B60N 2/2887 |
| | | | 297/250.1 |

* cited by examiner

CAR SEAT BASE WITH A LOCK POSITION INDICATOR MECHANISM

BACKGROUND OF THE INVENTION

Field of the Invention

The present invention relates to a lock position indicator mechanism, especially to a car seat base equipped with a lock position indicator mechanism which capable of indicating whether or not a car seat has been locked on the base successfully.

Description of the Related Art

Car seat bases are normally comprise one or more ISOFIX connectors, where the one or more ISOFIX connectors are to be locked to anchorage means provided in the passenger's seat.

The use of car seat base is to releasably connect a car seat and offers an easy installation of the car seat in a vehicle. The connection between the car seat and the base relies on a set of locking unit mounted inside the base; therefore, when the car seat is installed onto the base, users cannot inspect by their eyes to make sure whether the installation has been completed.

If two vehicles collide together accidentally, the inertial force on the baby occupant can be up to ten times their weight. If some of the locking units in the base have not been held or hooked the car seat completely, the baby occupant may fly with the car seat forwardly from the base, this would seriously endanger the baby occupant's life in traffic accident.

SUMMARY OF THE INVENTION

For solving the fore-mentioned safety problem to the baby occupant of a car seat base, the present invention provides a lock position indicator mechanism in a car seat base. The car seat base may include at least two locking units, an indicating unit and an associating unit. The locking units are mounted inside the base, each has a locked position for locking a car seat on the base when the car seat is rested on the base in a predetermined place, and an unlocked position for permitting the car seat to be released so as to depart from the base.

The indicating unit is rotatably mounted inside the base and being provided with a first color area and a second color area for indicating the positions of the locking units.

The associating unit is associated between the pair of locking unit and the indicating unit; when all of the locking units have been moved from the unlocked position to the locked position, the associating unit is capable of associating the indicating unit to reveal the first color area; and when one of the locking unit has failed to move from the unlocked position to the locked position, the associating unit is associating the indicating unit to reveal the second color area.

BRIEF DESCRIPTION OF THE DRAWINGS

The accompanying drawings, which are included to provide a further understanding of the invention are incorporated in and constitute a part of this specification, illustrate embodiments of the invention and together with the description serve to explain the principles of the invention. In the drawings.

DETAILED DESCRIPTION OF THE PREFERRED EMBODIMENTS

An embodiment of the car seat base with a lock position indicator mechanism according to the present invention, includes at least two locking units 2, an indicating unit 3 and an associating unit 4.

Figure 5:
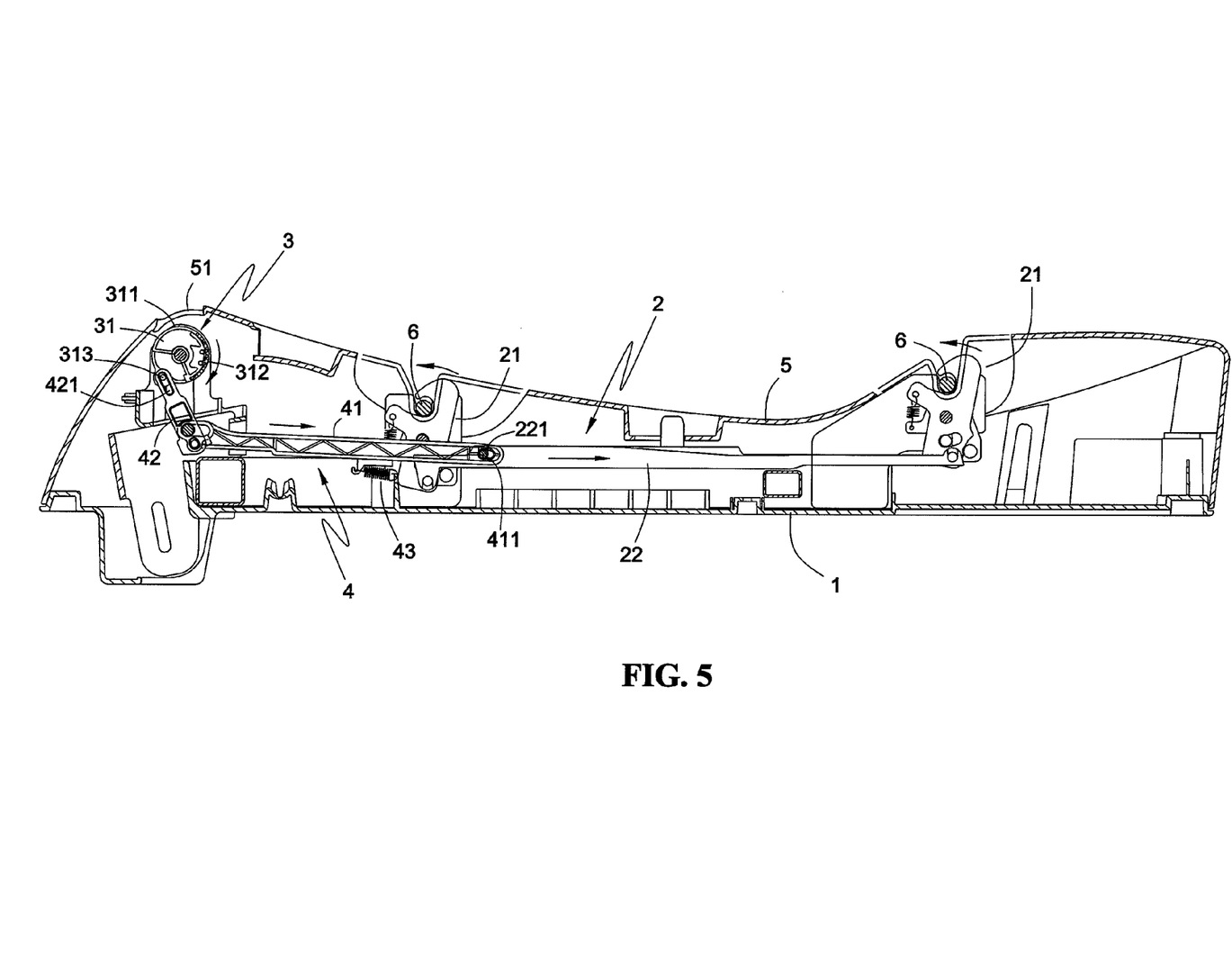
FIG. 5 is a cross-sectional view showing the operation of the lock position indicator mechanism, while a car seat (not shown) has rested on the base in place and a locking unit has held the transverse rods mounted under the car seat. This can drive the first link to move in a direction capable of associating the indicating unit to reveal a first color area through a window on the base.

The car seat (not shown) has equipped with two transverse rods 6 mounted on the underside thereof. The two transverse rods 6 are capable of inserting into and holding by the locking units 2, and each of the locking units 2 includes a hook element 21 for holding the transverse rod 6 by rotation from an unlocked position (as being schematically illustrated in FIG. 7) to a locked position (as being schematically illustrated in FIGS. 5 to 6).

Figure 1:
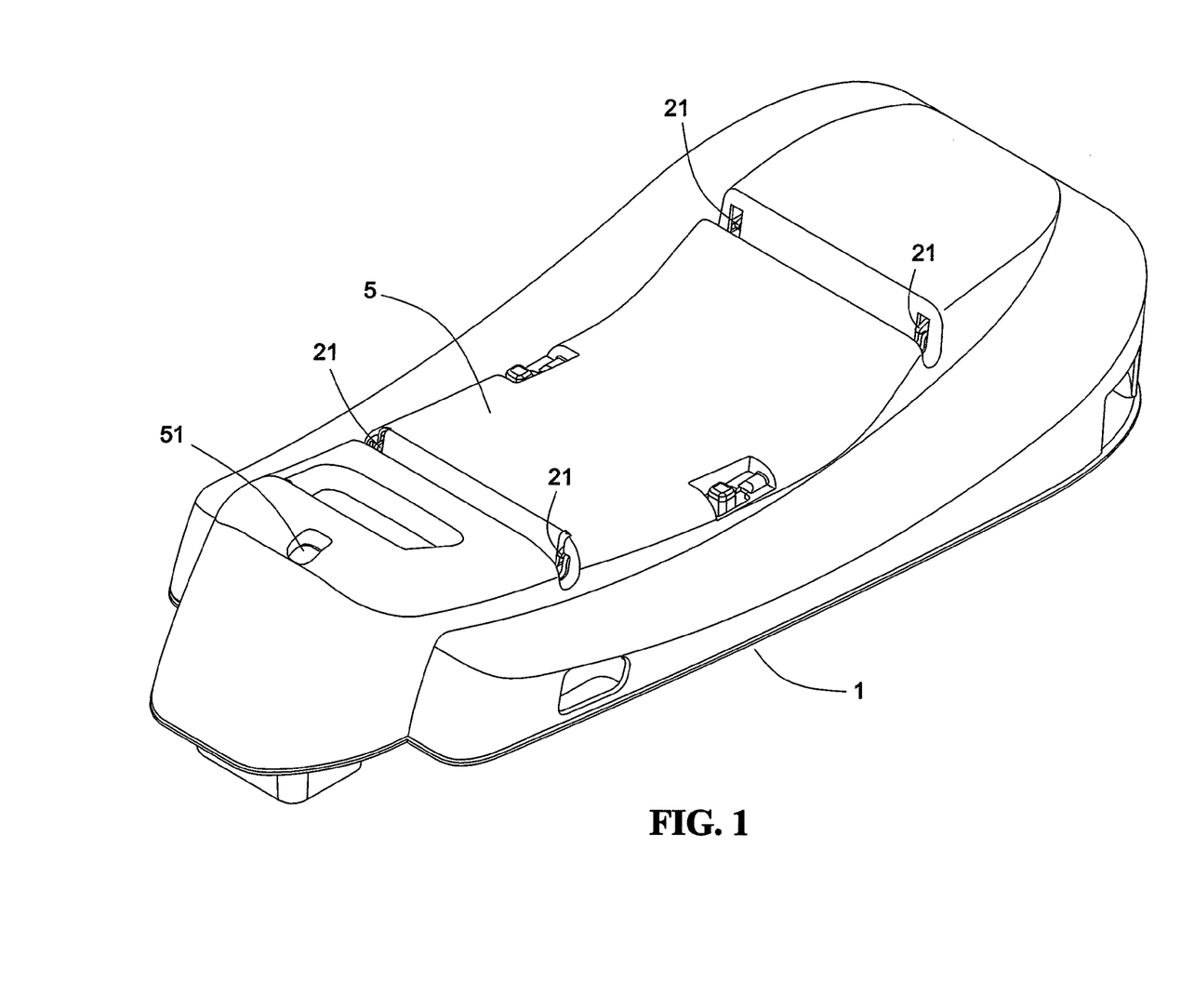
FIG. 1 is a perspective view showing a car seat base equipped with a lock position indicator mechanism according to the present invention.
Figure 2:
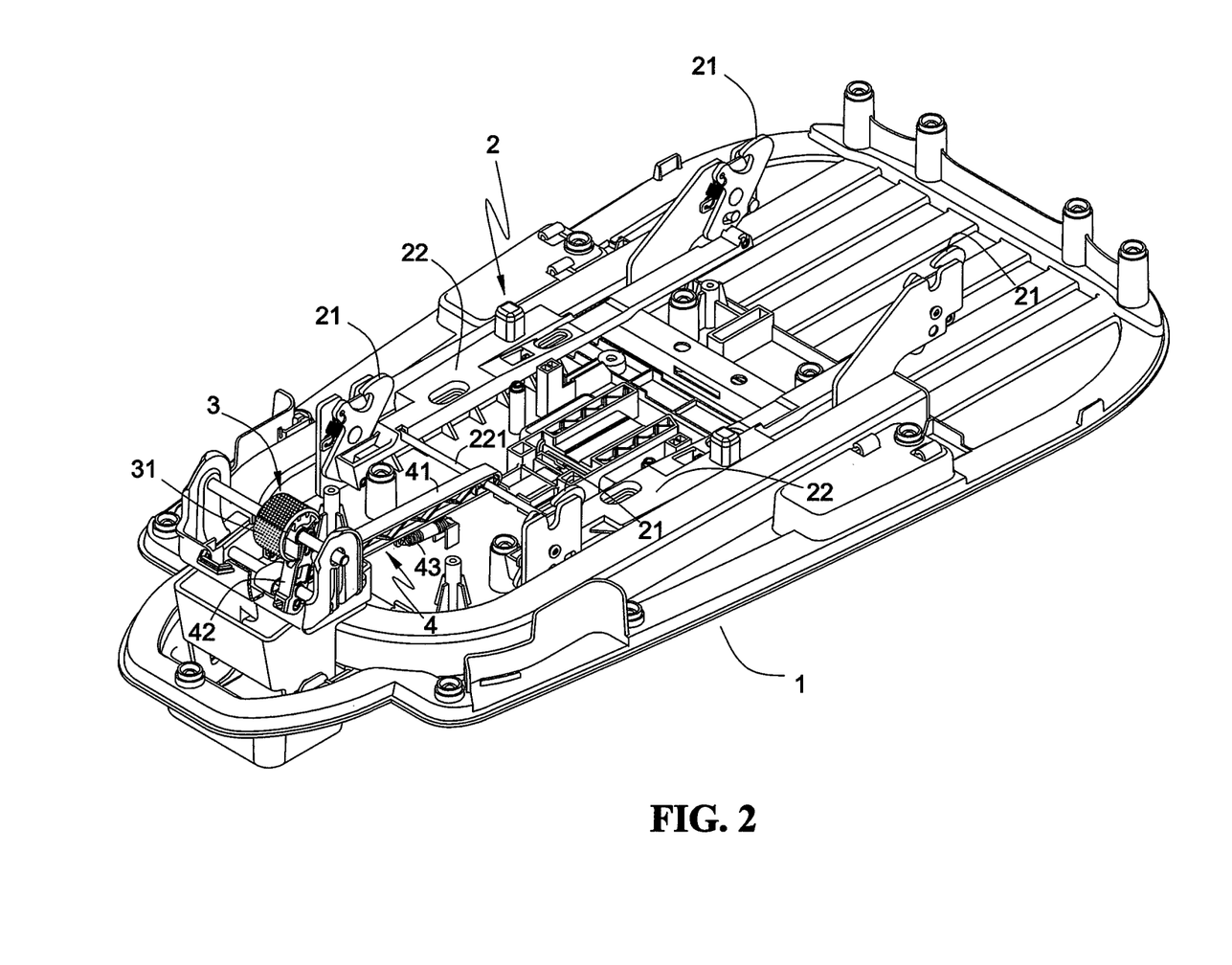
FIG. 2 is a perspective view showing the car seat base equipped with a lock position indicator mechanism, the upper wall of the base has been removed for more clearly showing the present invention.

Referring to FIGS. 1 to 2, the base 1 has an upper wall 5 formed with a window 51 for revealing either a first color area 311 or a second color area 312 of the indicating unit 3 thereby indicating the positions of the locking units 2.

The locking units 2 are mounted inside the base 1, each can be rotated to the locked position for locking a car seat when the car seat is rested on the base 1 in a predetermined place, and to the unlocked position for permitting the car seat to be released so as to depart from the base 1.

The indicating unit 3 is rotatably mounted inside the base 1 and being provided with a first color area 311 and a second color area 312 for indicating the positions of the locking units 2. Preferably, the first color area 311 may be embodied as being covered with a green color for indicating that the car seat has been locked on the base 1 successfully, and the second color area 312 may be covered with a red color for warning the user that the car seat has not been locked on the base 1 completely.

The associating unit 4 is associated between the pair of locking unit 2 and the indicating unit 3; when all of the locking units 2 have been moved from the unlocked position to the locked position, the associating unit 4 is capable of associating the indicating unit 3 to reveal the first color area 311; and if one of the locking unit 2 has been failed to move from the unlocked position to the locked position, the associating unit 4 is associating the indicating unit 3 to reveal the second color area 312.

Figure 3:
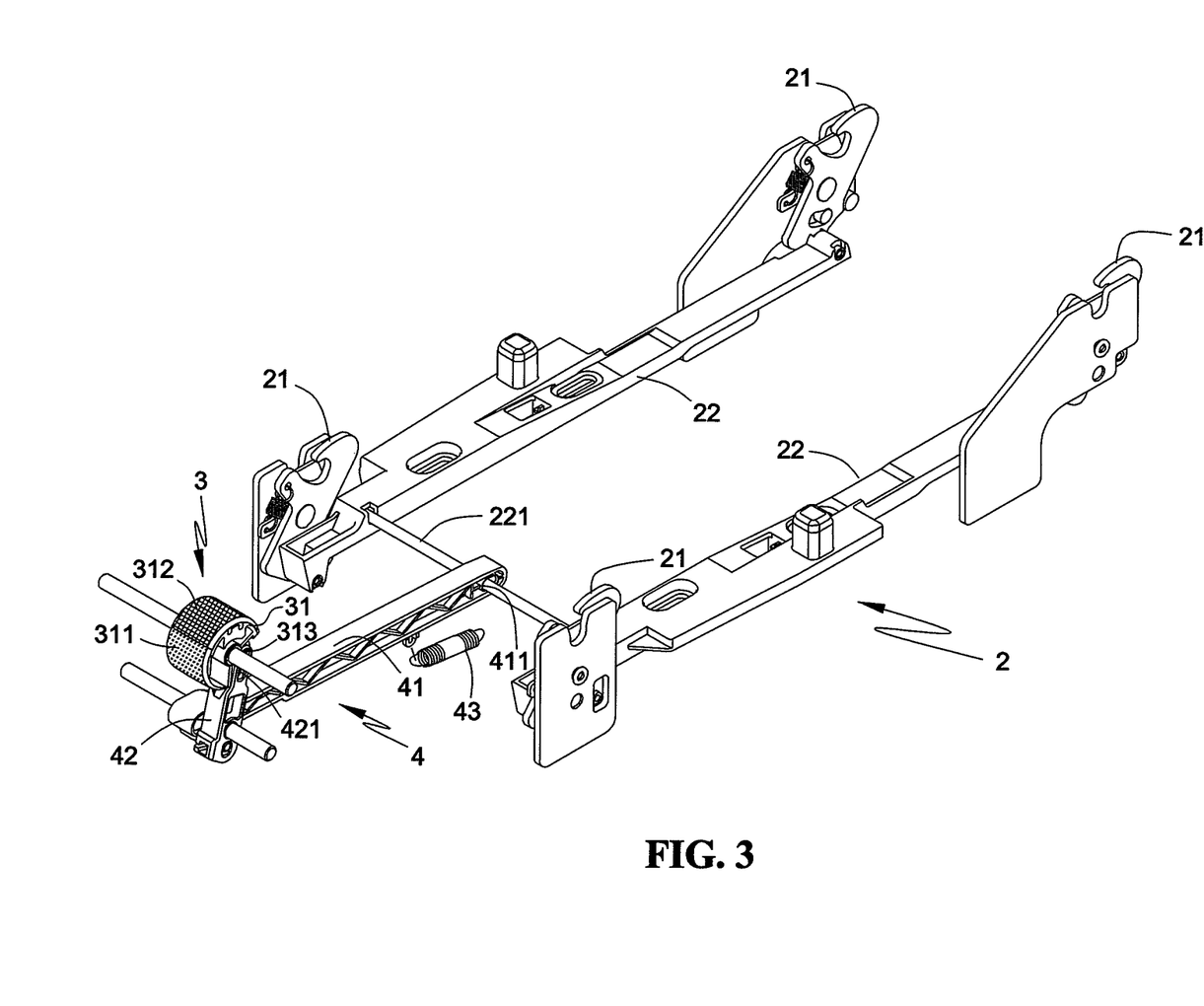
FIG. 3 is a perspective view showing the car seat base equipped with a lock position indicator mechanism, the upper walls of the base has been removed for more clearly showing the present invention.
Figure 4:
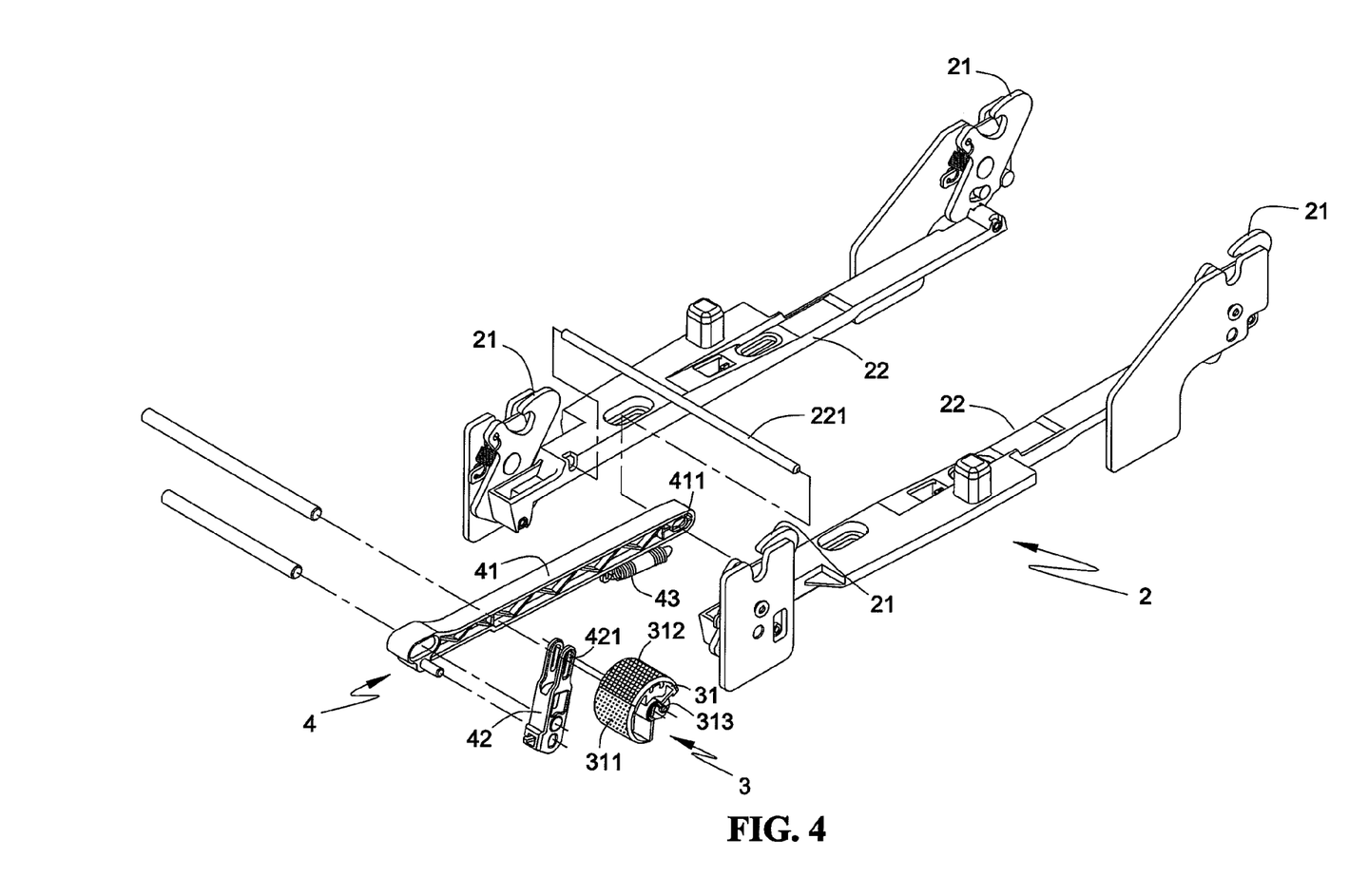
FIG. 4 is an exploded perspective view showing the lock position indicator mechanism.

Preferably, the car seat base according to the present invention may be equipped with four locking units 2 as shown in FIGS. 3 to 4. In this embodiment, the associating unit 4 may include two first links 22, a central link 41 and a resilient element 43. The two first links 22, each is associated between two of the locking units 2 and has a side extending member 221. The central link 41 has a first end 411 which being normally abutted to the side extending member 221, and a second end associated with the indicating unit 3. The resilient element 43 is mounted inside the base 1 for biasing the central link 41 so as to keep the first end 411 normally abutting on the side extending member 221.

Figure 6:
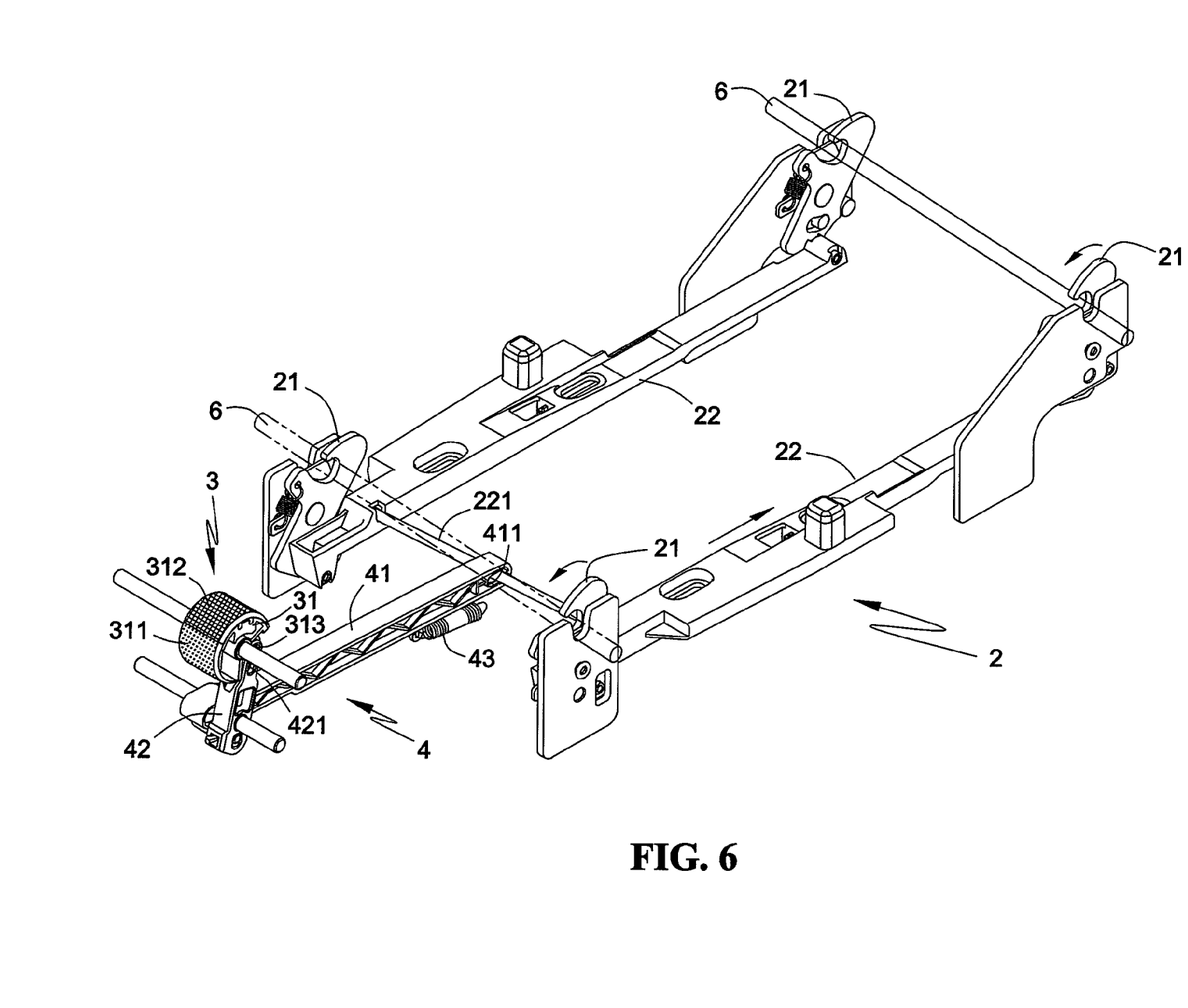
FIG. 6 is a schematic view illustrating that the transverse rods under the car seat have not yet held by the locking unit completely, this would cause only one first link being driven in the direction as the arrow indicated, and the indicating unit reveals the second color area through the window in this situation.
Figure 7:
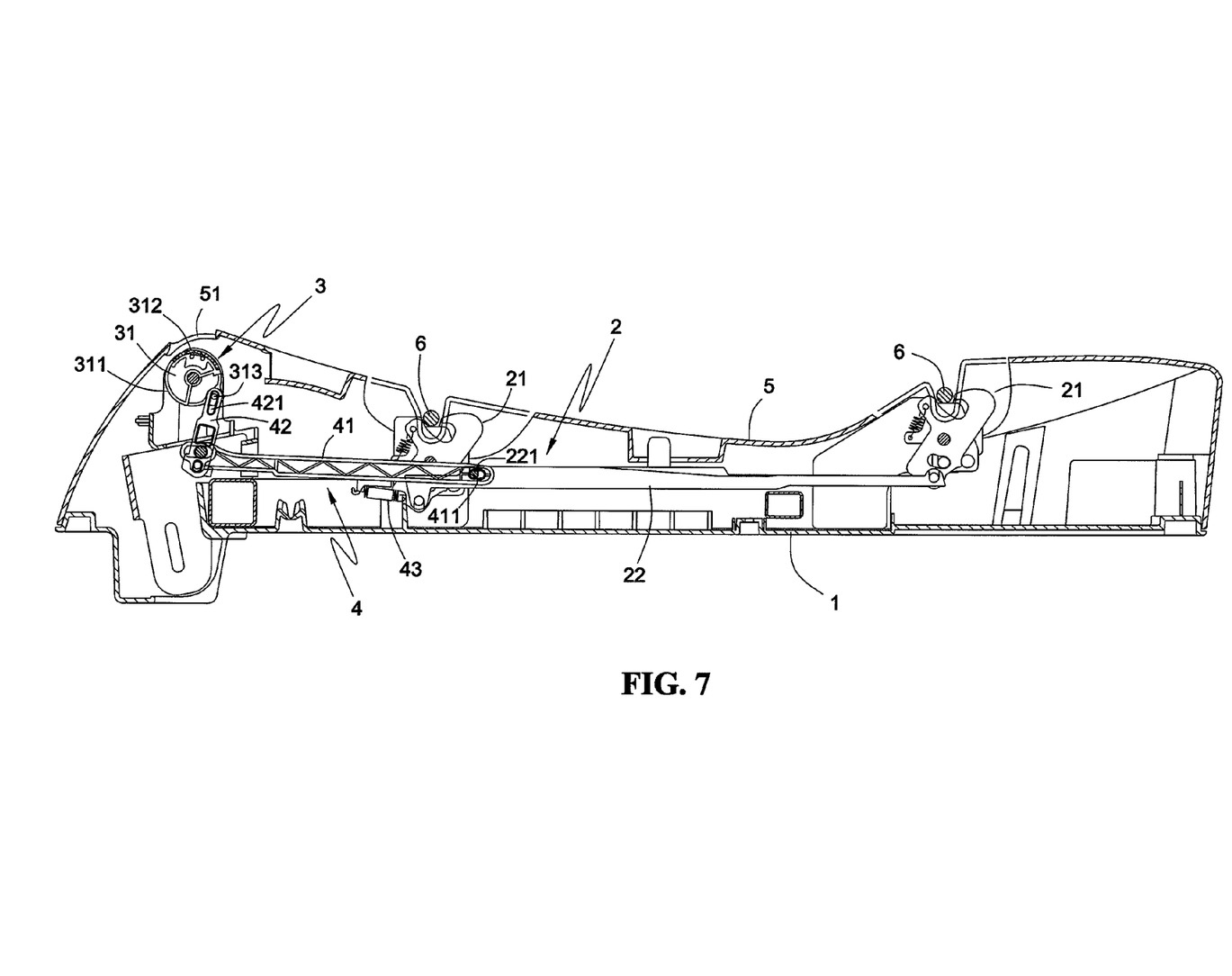
FIG. 7 is a cross-sectional view showing the lock position indicator mechanism, in which the locking units are opening to receive the transverse rods, the indicating unit reveals a second color area through the window.

The side extending member 221 may be embodied as a rigid element which rotatably connected between the two first links 22 and abutted against the first end 411 of the central link 41 with its middle portion (schematically shown in FIG. 6). Preferably, the first end 411 of the central link 41 may be formed with a slot for permitting the side extending member 221 passing therethrough and abutting on one end of said slot. By this arrangement, when one of the locking unit 2 has been failed to move from the unlocked position to the locked position, the associating unit 4 shall associate the indicating unit 3 to reveal the second color area 312.

Figure 8:
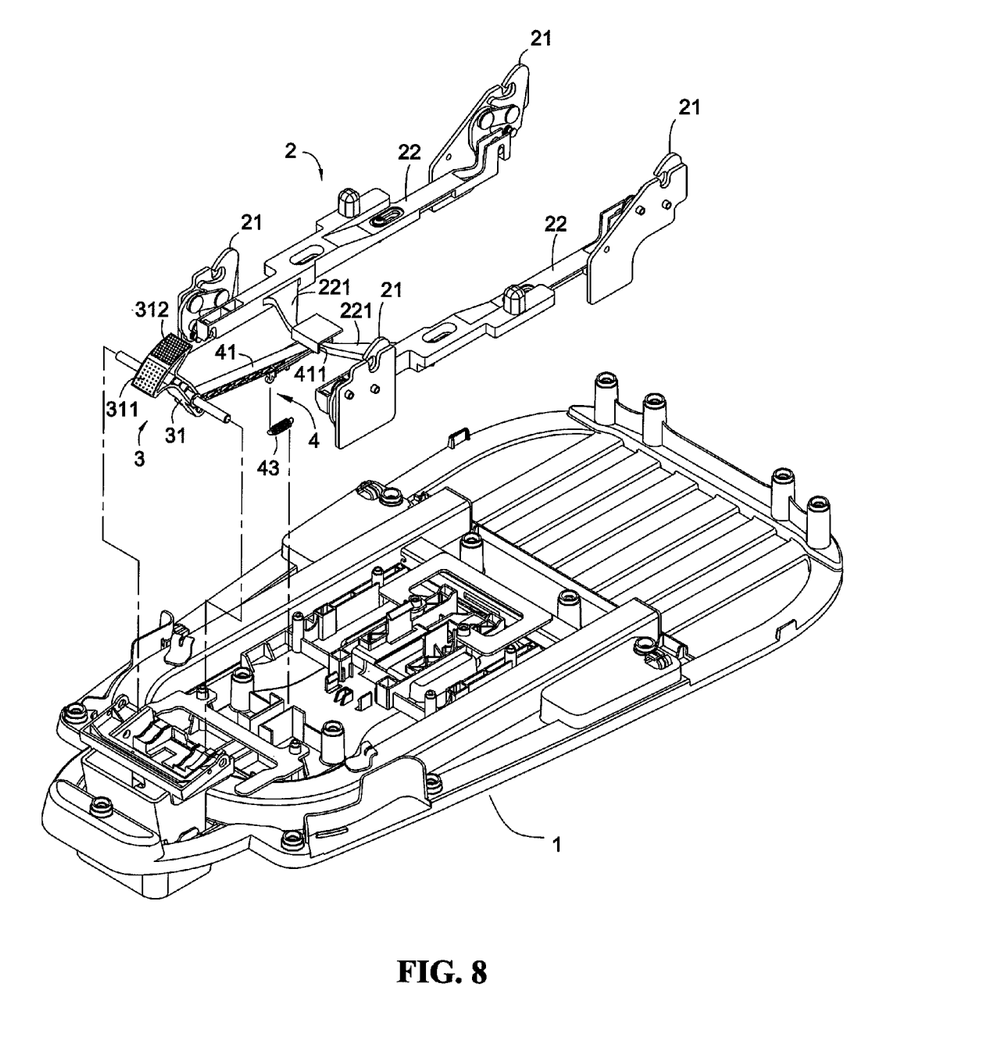
FIG. 8 is a schematic view showing another way for embodying the indicating unit and the associating unit according to the present invention.
Figure 9:
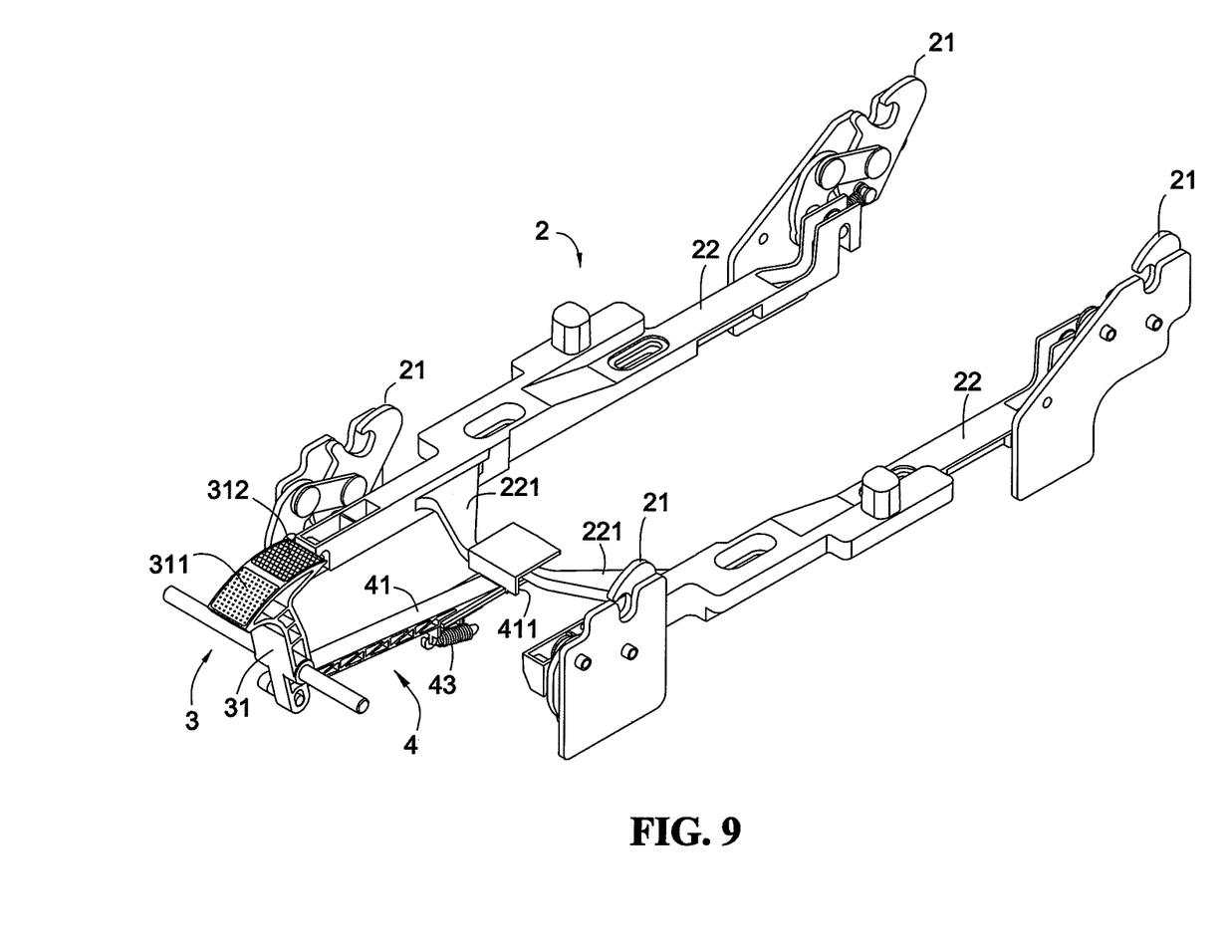
FIG. 9 is a schematic view illustrating that one of the locking units has not yet closed to hold a transverse rods (being removed for more clearly showing), this would cause the indicating unit reveals the second color area through the window.

Referring to FIGS. 8 and 9, each of first links 22 may either be connected or formed integrally with a side extending member 221, and the first end 411 of the central link 41 may be formed with a flange for abutting by said side extending members 221. By this arrangement, once one of the locking unit 2 has been failed to move from the unlocked position to the locked position, the associating unit 4 shall associate the indicating unit 3 to reveal the second color area 312 through the window 51.

The indicating unit 3 may also be embodied as a stem which pivoted inside the base 1 and having a rotatable cell 31 formed integrally at the upper end of said stem for providing the first color area 311 and the second color area 312. In this embodiment, the second end of the central link 41 is pivoted with the lower end of the stem for moving the rotatable cell 31 by rotation in an angle.

Referring back to FIGS. 3 and 4, the indicating unit 3 may also be alternatively embodied as rotatable cell 31 which pivoted inside the base 1 for providing the first color area 311 and the second color area 312. In this embodiment, the rotatable cell 31 is formed with a protruded portion 313, and the associating unit 4 may further include a second link 42 pivoted inside the base 1. The second link 42 has one end formed with a slot 421 for pivotally engaging with the protruded portion 313, and another end pivoted with the second end of the central link 41. When the central link 41 moves, shall rotate the second link 42, and then rotate the rotatable cell 31 through the protruded portion 313.

By this arrangement, if one of the locking unit 2 has been failed to move from the unlocked position to the locked position, the associating unit 4 shall associate the indicating unit 3 to reveal the second color area 312 through the window 51.

While particular embodiments of the invention have been described, those skilled in the art will recognize that many modifications are possible that will achieve the same goals by substantially the same system, device or method, and where those systems, devices or methods still fall within the true spirit and scope of the invention disclosed.

What is claimed is:

1. A car seat base with a lock position indicator mechanism, including:
    at least two locking units mounted inside the car seat base, each having a locked position for locking a car seat when the car seat being rested on the base in a predetermined place, and an unlocked position for permitting the car seat to be lifted and departing from the base;
    an indicating unit rotatably mounted inside the base, having a first color area and a second color area for indicating the positions of the locking units; and
    an associating unit associated between the pair of locking units and the indicating unit; when all of the locking units being moved from the unlocked position to the locked position, the associating unit capable of associating the indicating unit to reveal the first color area; and if one of the locking units being failed to move from the unlocked position to the locked position, the associating unit is associating the indicating unit to reveal the second color area,
    wherein the associating unit includes:
        two first links, each associated between the locking units and connected with a side extending member;
        a central link having a first end normally abutted to the side extending member, and second end associated with the indicating unit; and
        a resilient element mounted inside the base for biasing the central link thereby urging the first end to normally abut against the side extending member.

2. The car seat base with a lock position indicator mechanism according to claim 1, wherein the side extending member is a rigid element rotatably connected between the two first links and abutted with the first end of the central link with a middle portion thereof.

3. The car seat base with a lock position indicator mechanism according to claim 1, wherein the first end of the central link is formed with a slot for permitting the side extending member to pass therethrough thereby abutting against one end of the slot.

4. The car seat base with a lock position indicator mechanism according to claim 1, wherein the first end of the central link is formed with a flange, and each of first links is connected with the side extending member for abutting against said flange independently.

5. The car seat base with a lock position indicator mechanism according to claim 1, wherein the first end of the central link is formed with a flange, and each of first links is formed integrally with the side extending member for abutting against said flange.

6. The car seat base with a lock position indicator mechanism according to claim 1, wherein the indicating unit includes a stem pivoted inside the base and a rotatable cell formed integrally at an upper end of the stem for providing the first color area and the second color area thereon; the second end of the central link is pivoted with the stem for moving the rotatable cell by rotation in an angle.

7. The car seat base with a lock position indicator mechanism according to claim 1, wherein the indicating unit includes a rotatable cell pivoted inside the base for providing the first color area and the second color area; the rotatable cell is formed with a protruded portion, and wherein the associating unit further includes a second link pivoted inside the base, the second link having one end formed with a slot for pivotally engaging with the protruded portion, and another end pivoted with the second end of the central link.

8. The car seat base with a lock position indicator mechanism according to claim 1, wherein the first color area is green, and the second color area is red.

9. The car seat base with a lock position indicator mechanism according to claim 1, wherein the base has an upper wall formed with a window for revealing either the first color area or the second color area for indicating the positions of the locking units.

10. The car seat base with a lock position indicator mechanism according to claim 1, wherein the car seat has two transverse rods capable of inserting into and holding by the locking units respectively, and each of the locking units includes a hook element for holding one of the transverse rods by rotation from the unlocked position to the locked position.

\* \* \* \* \*